United States Patent
Hays

(10) Patent No.: US 6,378,569 B1
(45) Date of Patent: Apr. 30, 2002

(54) FLEXIBLE DUCT HAND TOOL

(76) Inventor: Michael A. Hays, 425 Charlyne Way, Dacula, GA (US) 30019

( * ) Notice: Subject to any disclaimer, the term of this patent is extended or adjusted under 35 U.S.C. 154(b) by 0 days.

(21) Appl. No.: 09/687,502

(22) Filed: Oct. 13, 2000

Related U.S. Application Data

(60) Provisional application No. 60/159,909, filed on Oct. 15, 1999.

(51) Int. Cl.[7] .................................................. B21F 9/02
(52) U.S. Cl. ........................................ 140/123.6; 7/131
(58) Field of Search ........................... 7/129, 130, 131, 7/158; 140/123.5, 123.6

(56) References Cited

U.S. PATENT DOCUMENTS

| | | | |
|---|---|---|---|
| 821,659 A | * | 5/1906 | Lurtey ............................. 7/131 |
| 1,276,960 A | * | 8/1918 | Riggs ............................. 7/131 |
| 2,690,010 A | * | 9/1954 | Keller ........................... 30/252 |
| 4,947,901 A | | 8/1990 | Rancour et al. |
| 5,048,575 A | | 9/1991 | Smith |
| 5,185,930 A | | 2/1993 | Hamlin |
| 5,226,237 A | | 7/1993 | Rancour et al. |
| 5,303,475 A | | 4/1994 | Baker |
| 5,625,951 A | | 5/1997 | Hamlin |

\* cited by examiner

Primary Examiner—Lowell A. Larson
(74) Attorney, Agent, or Firm—Hughes & Kaplan; Barry E. Kaplan, Esq.

(57) ABSTRACT

A multipurpose, flexible duct hand tool with a knife portion having a blade member, a cutting notch, a wire cutting member, a band-clamp head grasping means, and a handle member; a cutter portion having a wire cutting member, a band-clamp band grasping means, and a handle member; a pin for pivotally joining the knife and cutter portions; a spring for biasing the handle member of the cutter portion to the open position; and, a hook for locking the device in the closed position.

31 Claims, 2 Drawing Sheets

FLEXIBLE DUCT HAND TOOL

RELATED APPLICATIONS

The inventor hereof claims priority based upon and pursuant to the U.S. provisional patent application having Ser. No. 60/159,909 filed on Oct. 15, 1999.

TECHNICAL FIELD

The present invention relates generally to tools; and, more specifically, to a multipurpose hand tool useful in working with flexible duct, the hand tool comprising, in combination, a knife, a wire cutting tool, and a band-clamp tensioning means.

BACKGROUND ART

Tools are a necessary and essential asset of any tradesman. Having the proper and most efficient tool for a given task can result in an enormous cumulative reduction in man-hours and material, and, thus, costs. One particular trade in which the preferred embodiment of the present invention can be utilized is the installation and maintenance of heating and air-conditioning ventilation systems. Within this trade, flexible ductwork must be cut to fit a specific leg or piece of the ventilation system.

Well known in the art, this ductwork is comprised generally of an outer sheath of protective flexible, sheet-like material, usually silver in appearance. The outer sheath typically overlies a bat of conventional fiberglass-type insulation. The form of the ductwork is maintained through the use of a wound, continuous or semi-continuous plastic or metal wire, contained within a sheet-like barrier. The configuration of such flexible ductwork may vary by manufacturer and by type of ductwork. The advantage in the use of flexible ductwork is that it may be conveniently cut and shaped to a customized configuration.

During the installation of the flexible ductwork, the ductwork must be attached to a confronting, adjoining piece, such as, for example, a manifold, vent, or in-line adapter. Such pieces typically include a short, thin walled, cylindrically-shaped adapter over which the flexible ductwork may be positioned and attached during installation. It is typical to utilize for such purposes a type of flexible clamp known as a band-clamp. While several forms of band-type clamps are well-known in the art, a particular form has come into widespread use during recent years. This form of band-clamp is manufactured principally of a flexible, narrow, strap-like material, often of plastics or nylons. One end of the clamp comprises a tapered tip; the other, a clamp head. Closely spaced, tooth-like ridges are formed upon one of the flat sides of the band, along the area between the tip and the head. The head has a slot through which the tip of the band may be presented. Within the slot is a flat, tongue-like element, bent at its end, and further shaped for ratchet-like engagement with the tooth-like ridges of the band. This arrangement provides for unidirectional insertion and locking of the band at each tooth-like ridge, as the band is inserted and drawn through the head.

During the typical installation process, one end of the flexible ductwork is applied over the adapter of the confronting piece. A band-clamp is then positioned over both the flexible ductwork and the underlying adapter, whereupon the band-clamp is tightened according to preferred installation parameters. Finally, the excess portion of the band-clamp is cut-off so that it will not subsequently hang or otherwise interfere with the system.

Prior art installation methods, and the devices attendant to such purposes, however, have required that the installer have access to up to three separate tools in order to perform these tasks. That is, he must have one tool, such as a knife, for cutting the outer sheath and insulation portions of the flexible ductwork; a second tool, such as a wire cutter, for cutting the plastic or metal wire portion; and, a third tool, such as a cable tie tensioning tool, for tightening and cutting the band-clamp. Because the installer typically works in close confines such as attics and crawl spaces, the need to carry and utilize three separate tools to perform the installation of flexible ductwork is both cumbersome and inefficient.

In an attempt to overcome some of these deficiencies, certain integrated tools have been proposed. Examples of such devices may be found by reference to U.S. Pat. No. 5,185,930 to Hamlin; U.S. Pat. No. 5,226,237 to Rancour et al.; U.S. Pat. No. 5,303,475 to Baker; and, U.S. Pat. No. 5,625,951 to Hamlin. In light of the present invention, however, the aforementioned designs are cumbersome to use, relatively expensive to purchase, and heavy to carry.

It is, thus, readily apparent that a new and improved, multipurpose tool is needed that is relatively lightweight, easy to use, and inexpensive. It is, therefore, to the provision of such an improvement that the present invention is directed.

BRIEF SUMMARY OF THE INVENTION

Briefly described, in a preferred embodiment, the present invention overcomes the above-mentioned disadvantages by providing a multipurpose flexible duct hand tool comprising, in combination, a knife, a wire cutting means, and a band-clamp tensioning means, the tool being relatively compact, lightweight, easy to use, and inexpensive.

More specifically, the present invention, in the preferred embodiment, comprises a knife portion having a blade member, a cutting notch and a wire cutting member, a band-clamp head grasping means, and a handle member; a cutter portion having a wire cutting member, a band-clamp band grasping means, and a handle member; a pin for pivotally joining the knife and cutter portions; a spring for biasing the handle member of the cutter portion to the open position; and, a hook for locking the device in the closed position.

Preferably, the cutter portion is pivotally secured to the handle member of the knife portion via a screw, rivet, or pin member. One end of the spring is attached generally to the handle member of the knife portion, and the other end is attached generally to the handle member of the cutter portion; thus, urging the handles away from each other. In the preferred embodiment, the band-clamp head grasping means is positioned on the handle member of the knife portion in such a position to limit the travel of the cutting member of the cutter portion. Thus, in use, the cutter portion is in the open, ready-for-use position. For carrying and storage safety concerns, a lock mechanism comprising a hook-like member, carried preferably on the cutter handle, and a capturing means, carried or formed on the knife handle, is provided to lock the two handles together in the closed position.

The cutting member comprises wire cutting member having a cutting edge that generally travels in a curved path when the cutter handle is pivoted, and in close proximity to the cooperating notch and wire cutting member formed on the knife handle. As such, in use, the wire to be cut is extended through the notch and the user simply squeezes the handles together; thereby, pivoting the cutter edge to and through the wire and, thus, severing the wire.

Accordingly, for flexible ductwork cutting applications, the blade of the knife portion is utilized to cut the periphery of the outer sheath material and the fiberglass insulation. Upon contact with the wire, the wire is inserted through the notch and the cutter handle is squeezed toward the knife handle; thus, severing the wire. It should be noted that the preferred embodiment of the present invention may be utilized for numerous applications requiring the cutting of a variety of materials.

Provided on the cutter portion and on the knife portion are means for grasping and subsequently tensioning a band-clamp of a type utilized in the heating, ventilation, and air-conditioning field. Upon looping and presenting the band portion through the head portion of the band-clamp, the operator places the head of the band-clamp adjacent the knife portion grasping means, and the band portion through the cutter portion grasping means. Upon operation of the tool handle, the band-clamp is tightened in successive increments according to the tension desired by the operator. The cutter portion of the device of the present invention may then be utilized to shorten any excess band portion to an appropriate length.

In an alternate embodiment, the respective handles of the device are reconfigured into a plier-like shape and form in order to provide additional operator finger clearance and enhanced grasp for, and during, tensioning and cutting operations.

Thus, an object, feature, and advantage of the present invention is the provision of a new and improved multipurpose, integrated cutting tool having a knife, a wire cutter, and a band-clamp tensioning means.

Another object, feature, and advantage of the present invention is the provision of a new and improved integrated cutting tool having a knife, a wire cutter, and a band-clamp tensioning means that can be easily operated with one hand.

A further feature and advantage of the preferred embodiment of the present invention is the provision of a new and improved integrated cutting tool having means for urging the cutting handle to the open position.

Yet another object, feature, and advantage of the present invention is the provision of a new and improved integrated cutting tool having means for releasably locking the cutting handle in a closed position for storage or during periods of nonuse.

Still another object, feature, and advantage of the present invention is the provision of a new and improved integrated cutting tool that is lightweight, compact, and easy to manufacture.

Yet still another object, feature, and advantage of the present invention is the provision of a new and improved integrated cutting tool that requires relatively small amounts of force for cutting wire or the like.

Yet still another and further object, feature, and advantage of the present invention is the provision of a new and improved integrated cutting tool that provides plier-like handles for enhanced operator comfort and ease of use of the tool.

These and other objects, features and advantages of the invention will become more apparent to one skilled in the art from the following description and claims when read in light of the accompanying drawings.

BRIEF DESCRIPTION OF THE FIGS.

DETAILED DESCRIPTION OF THE PREFERRED AND ALTERNATE EMBODIMENTS

Figure 1:
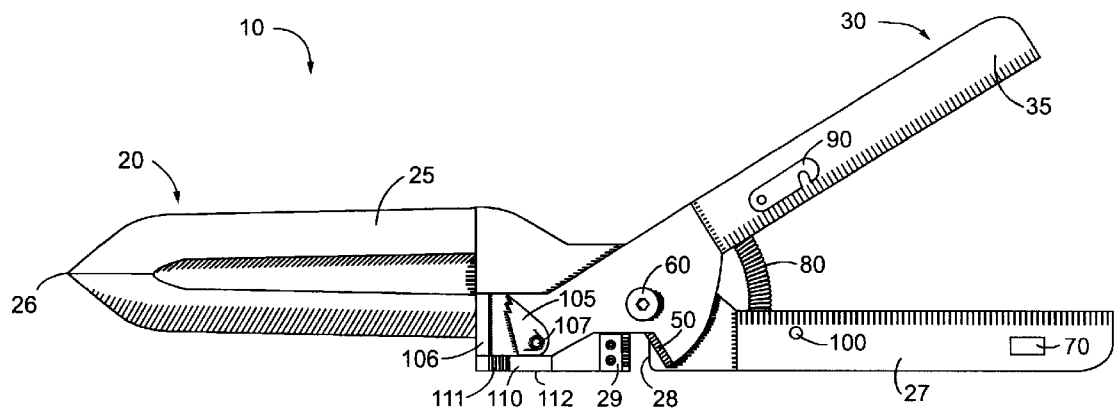
FIG. 1 is an elevation view of the flexible duct hand tool of the present invention according to a preferred embodiment, shown in the open position.
Figure 2:
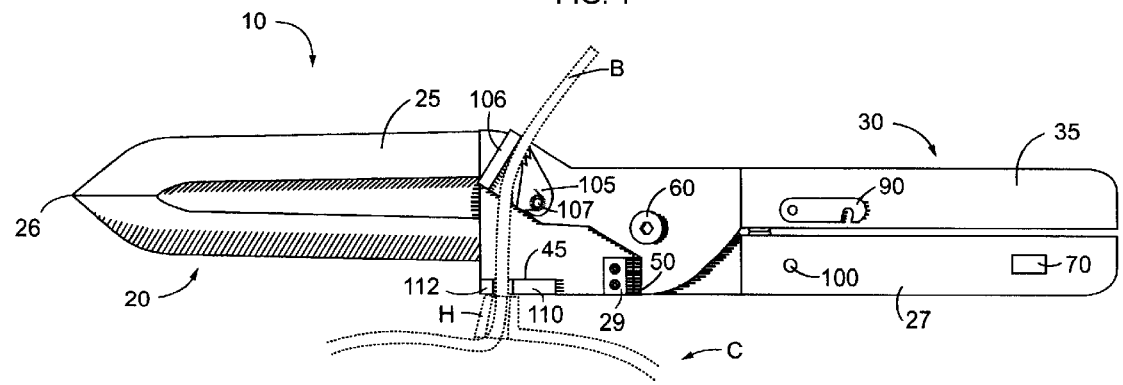
FIG. 2 is an elevation view of the flexible duct hand tool of the present invention according to a preferred embodiment, shown in the closed position.
Figure 3:
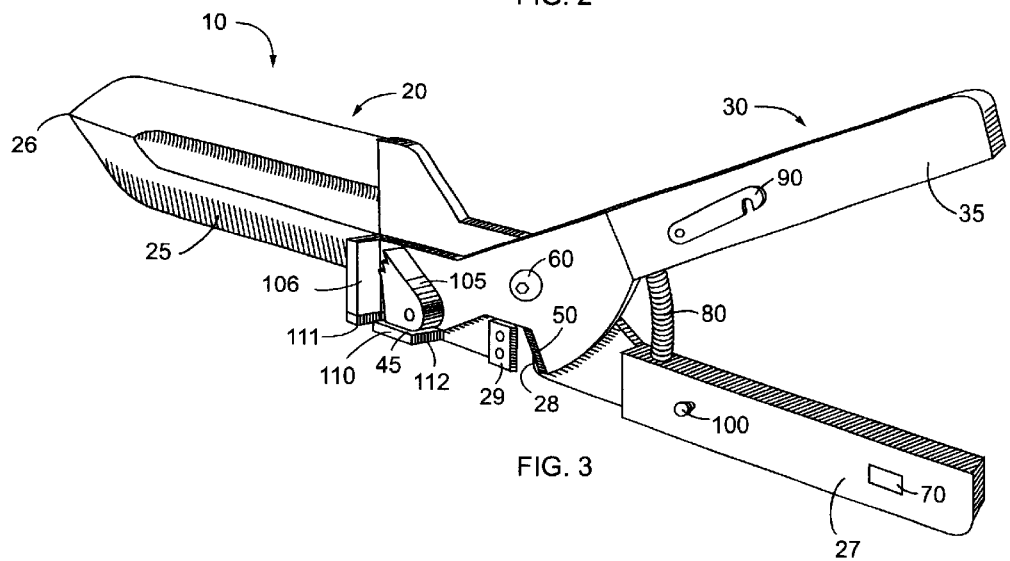
FIG. 3 is a perspective view of the flexible duct hand tool of the present invention according a preferred embodiment, shown in the open position.

Referring now to FIGS. 1–3, device 10 generally comprises knife portion 20 and cutter portion 30. More specifically, knife portion 20 comprises blade portion 25 and a handle portion 27. It will be appreciated by one skilled in the art that blade portion 25 might be either a single edge blade, a double edge blade, a serrated blade, or combinations thereof. It is preferred that blade portion 25 taper to a piercing-type tip 26, of a form well-known in the art.

According to the purposes described in greater detail hereinbelow, knife portion 20 further includes a notch 28. Notch 28 may carry a wire cutting member 29, in the form of a blade, as shown, or a perpendicularly protruding bearing and cutting surface, in the form of an anvil.

Indicia 70 may conveniently be provided upon device 10, as in a manufacturer's trademark or other advertising copy.

A cutter 30 is provided having a handle portion 35 and a cutter edge portion 50. Cutter 30 is removably affixed to knife portion 20 via screw 60. Screw 60 may be shouldered or otherwise configured to allow relative rotation of cutter 30 with respect to knife portion 20. Means for enabling such rotation may conveniently be observed by reference to an ordinary household scissors, pliers, or the like. The cutting action provided by the jaw-like cooperation of wire cutting member 29 and cutter edge portion 50 serves to sever, shear, or otherwise cut an object placed therebetween, such as a wire.

A flattened portion of cutter 30 is disposed to rest against stop edge 45 of knife portion 20. Stop edge 45 serves, in one capacity, to limit the arcuate travel of cutter 30.

Also provided is a band-clamp tensioning means. On the cutter portion 30 and on the knife portion 20 are cooperating means for grasping and subsequently tensioning a plastic or nylon band-clamp C, shown at FIG. 2, of a type often utilized in the heating, ventilation, and air-conditioning field. FIG. 2 further demonstrates device 10 in the closed position, and provides a convenient depiction of device 10 engaging a band-clamp C in an tensioning-type operating position.

In the embodiments shown, the band clamp tensioning means takes the form of a band engagement and clamping portion 105 that operates in cooperative fashion with band support portion 106. Band engagement and clamping portion 105 is rotatably biased toward band support portion 106 by spring and pin assembly 107. Such operation is best seen with reference to FIGS. 2 and 4. Located upon knife portion 20 is band-clamp head grasping means 110. Band-clamp head grasping means 110 bears slot 111 for passing a band-clamp band B therethrough. Band-clamp head grasping means further comprises a head support surface 112 for supporting band-clamp head H. In operation, the band-clamp tensioning means operates substantially as will be described further below.

Notwithstanding the band-clamp tensioning arrangement shown in the exemplary embodiments of FIGS. 1–6, it will be apparent to one ordinarily skilled in the art that other well-known mechanically advantaged configurations may be provided to suit the same purposes as have been hereinabove described. One example of such a mechanism may be seen with reference to Malco Products, Inc. (Annandale, Minn., USA) Adjustable, High Leverage Tensioning Tools with Auto-Cut-Off, Item No. TY6 (covered by one or more of U.S. Pat. Nos. 4,947,901 and 5,048,575). It is noted, however, that the tensioning means of the present invention advantageously is accessible through a side approach, in contrast to other devices, such as the referenced Malco device, which requires that the band-clamp be threaded through the jaws of that device.

Device 10 may be provided with a spring 80. Spring 80 bears against knife portion 20 on its handle end, by, for example a relief groove or channel provided therein for the purpose. Similarly, spring 80 bears against cutter 30 on its handle end. In this manner, cutter handle 35 is biased away from knife handle 27.

With continuing reference to FIGS. 1–3, hook means 90 may be provided on cutter handle 35 for cooperative engagement with hook capturing means 100 on knife handle 27. In this way, cutter 30 may be closed and locked against knife handle 27 for safety and convenience in storage and carrying the tool.

Figure 4:
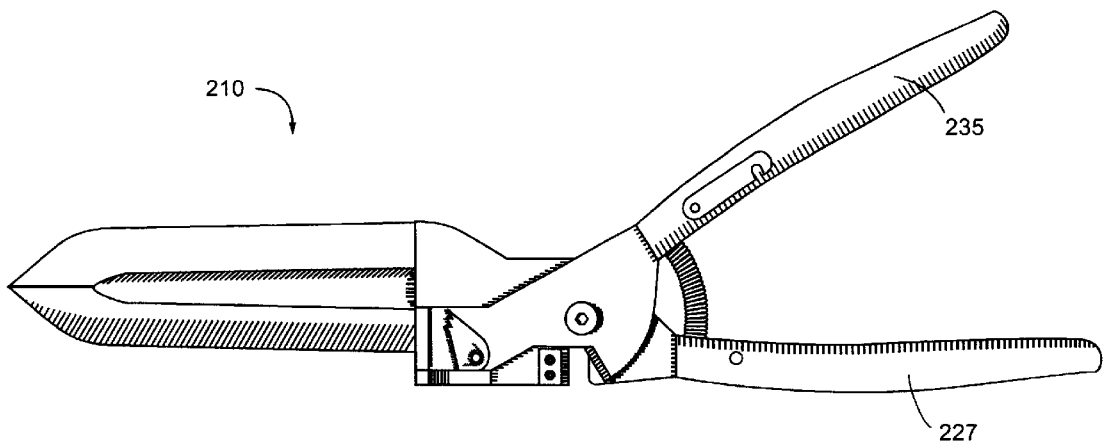
FIG. 4 is an elevation view of the flexible duct hand tool of the present invention according to an alternate embodiment, shown in the open position.
Figure 5:
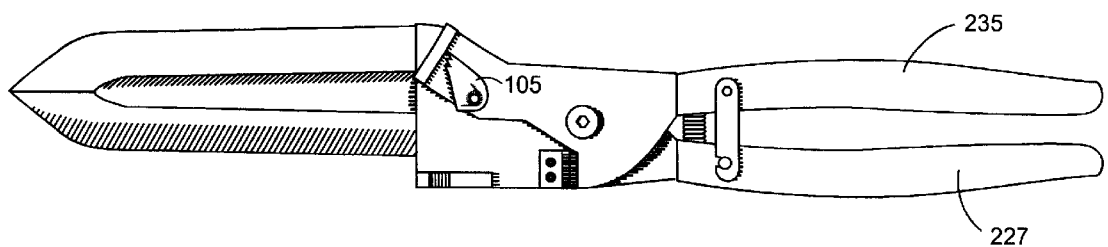
FIG. 5 is an elevation view of the flexible duct hand tool of the present invention according to an alternate embodiment, shown in the closed position; and, FIG. 6 is a perspective view of the flexible duct hand tool of the present invention according an alternate embodiment, shown in the open position.
Figure 6:
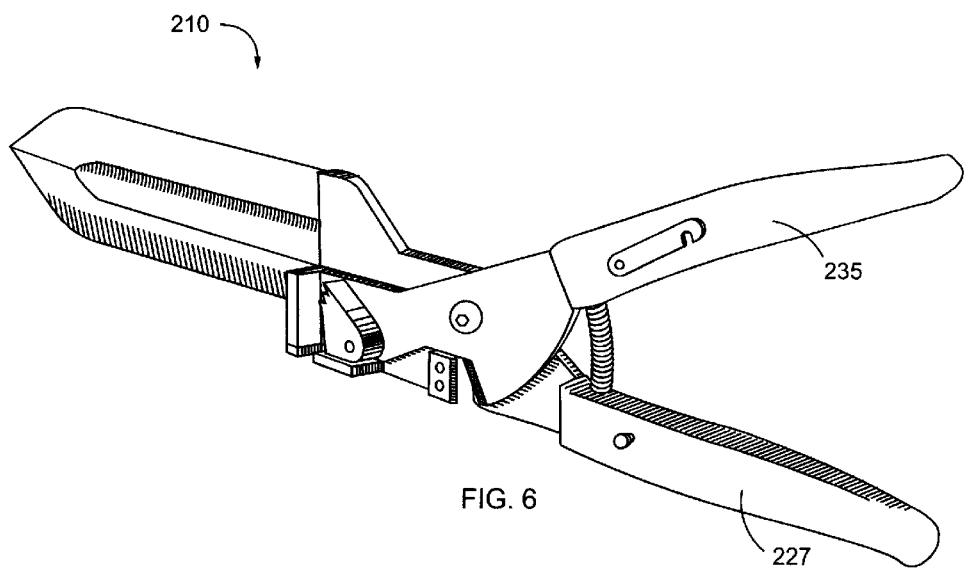

As best seen with reference to FIGS. 4–6, device 210 might be provided in alternative embodiments wherein the handles have a curved portion, as in plier-like arrangement, sized and dimensioned for receiving the fingers of the user's hand. These features are demonstrated in the Figures as knife handle 227 and cutter handle 235. Such alternative handle forms render device 210 more comfortable and convenient to use in certain applications, or at the discretion of the user.

It will be appreciated by one ordinarily skilled in the art that device 10, 210 may be provided in various lengths and sizes to accommodate the needs of a particular user or industrial application.

Device 10, 210 may be formed of a variety of materials, including, by way of example only and without limitation, carbon steel, stainless steel, or the like, with individual components made of brass, plastic, or the like. Blade and cutter portions may be provided of suitably hardened materials according to processes of manufacture well-known in the art.

For the application of cutting flexible ductwork, device 10 is inserted into a segment of flexible ductwork to be cut. Piercing tip 26 is conveniently used for such purpose. Blade portion 25 is used to cut the periphery of the outer sheath material and the fiberglass insulation. Upon contact with the plastic or metal wire of the ductwork, cutter handle 35 is opened with a convenient single-handed motion, serving to release cooperating closure means 90, 100, which allows spring 80 to bias cutter handle portion 35 away from knife handle portion 27.

The wire of the ductwork is inserted into notch 28. Cutter handle 35 is squeezed toward knife handle 27, tending to cleanly shear or cut the wire. Device 10 may then be re-closed in a convenient single-handed motion. Should it be required, blade portion 25 is used to finish the cutting operation.

Next, the flexible ductwork is attached to a confronting, adjoining piece, such as, for example, a manifold, vent, or in-line adapter. Such pieces typically include a short, thin walled, cylindrically-shaped adapter over which the flexible ductwork may be positioned and attached during installation. A band-clamp C is looped around the flexible ductwork and its underlying support adapter, and positioned according to the requirements of the installer. Upon looping the band-clamp band B through the band-clamp head H of a band-clamp C, the operator places the head H of the band-clamp C adjacent head support surface 112, and the band B through slot 111 and into the space between band engagement and clamping portion 105 and band support portion 106. Upon operation of the tool handles, the band-clamp C is tightened in successive increments through the leverage provided by device 10 and according to the tension desired by the operator. The cutter portions of device 10 may then be utilized to shorten the excess band B to an appropriate length.

Although described above for use in cutting flexible ductwork, device 10 may find other, equally successful uses. For example, provided with a serrated blade, device 10 makes an apt fishing, hunting, or sport knife, wherein it may be convenient for a sportsman to have a conveniently disposed wire cutter for cutting hooks, binding wire, or the like. Provided with appropriately insulated handle materials, device 10 makes an appropriate and desirable tool for an electrician.

To further assist in the performance of these various applications, a multitude of embodiments are hereinbelow described. The portions of each alternate embodiment are generally as described above in the preferred embodiment except for the differences described hereinbelow.

For example, it is contemplated that the screw for the pivotable attachment of the cutter to the knife is placed closer to the cutting surface and thus farther from the distal end of the handle. As a result, the moment about the pivot point is larger thereby creating a greater force on the cutter as compared to the preferred embodiment for the same amount of hand force. The head of the cutter may be enlarged to accommodate the pivot screw.

In another alternate embodiment, the cutter extends at approximately a forty-five degree angle from an extension arm that is angled at an approximately negative forty-five degrees from the cutter handle. Thus, when the handles are joined together, the cutter is positioned generally parallel to a notch or wire cutting section formed on the opposite side of the blade from the cutter handle.

In yet another alternate embodiment, a cutter head is provided having a dual cutting surface, wherein a cutting surface extends to each side of the blade. Notches are formed on the blade in close proximity to each cutter; thus, providing a means for cutting wire on either side of the device. This arrangement eliminates the need to rotate the device or to switch hands for wire located on both sides of the cutter.

In yet still another alternate embodiment, the device is modified to better suit the applications of an electrician. For instance, a plurality of apertures having different diameters are formed proximal to the cutter for stripping insulated electrical wiring. Additionally, a plurality of sharp semicircular grooves are formed on the opposite side of the blade from the cutter to provide an additional stripping means. The user places a wire within the groove, applies a slight pressure preferably with his thumb and then rotates the device to sever the outside insulated portion of the wire. The radius of the grooves can be varied to accommodate various sized wiring.

In yet still another and further alternate embodiment, the knife portion is replaced with a razor blade portion to facilitate the precise cutting of a multitude of materials including more rigid materials such as drywall, cardboard, countertops, paneling, linoleum, and the like.

From these alternate embodiments, other forms of the device of the present invention may be readily conceived by those ordinarily skilled in the art.

Having thus described preferred embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A hand tool for cutting continuous-wire reinforced flexible insulation duct, and for installing and tensioning a band-clamp therearound, the tool being operable with one hand, comprising:
    an insulation cutting blade, said insulation cutting blade comprising a cutting notch, a band-clamp head grasping means, and a handle;
    a wire or band-clamp cutting blade; and,
    a band-clamp tensioning means.

2. The hand tool of claim 1, wherein said cutting notch is approximately perpendicular to said insulation cutting blade.

3. The hand tool of claim 1, wherein said band-clamp head grasping means further comprises a substantially planar portion for engaging the head portion of a band-clamp, and a slot within said planar portion for passing therethrough the band portion of a band-clamp.

4. The hand tool of claim 1, wherein said cutting notch and said band-clamp head grasping means lie between said insulation cutting blade and said handle.

5. The hand tool of claim 1, wherein said a wire or band-clamp cutting blade further comprises a band-clamp band grasping means and a handle member.

6. The hand tool of claim 5, wherein said wire or band-clamp cutting blade is approximately perpendicular to said handle member.

7. The hand tool of claim 5, wherein said band-clamp band grasping means further comprises a band engagement and clamping portion and a band support portion.

8. The hand tool of claim 7, wherein said band engagement and clamping portion articulates relative to said band support portion, said band engagement and clamping portion being rotatably biased toward said band support portion.

9. The hand tool of claim 1, wherein said insulation cutting blade and said wire or band-clamp cutting blade are pivotally connected.

10. The hand tool of claim 9, wherein said insulation cutting blade and said wire or band-clamp cutting blade are biased apart by resilient means.

11. The hand tool of claim 9, further comprising releasable locking means.

12. The hand tool of claim 11, wherein said releasable locking means comprises a hook-and-pin latch.

13. The hand tool of claim 1, wherein said insulation cutting blade further comprises a piercing tip.

14. A hand tool for cutting continuous-wire reinforced flexible insulation duct, and for installing and tensioning a band-clamp therearound, comprising in combination:
    a knife portion comprising a blade member, a cutting notch, a band-clamp head grasping means, and a handle member;
    a cutter portion comprising a wire or band-clamp cutting member, a band-clamp band grasping means, and a handle member; and,
    a pin for pivotally joining the knife and cutter portions.

15. The hand tool of claim 14, wherein said cutting notch is approximately perpendicular to said blade.

16. The hand tool of claim 14, wherein said band-clamp head grasping means further comprises a substantially planar portion for engaging the head portion of a band-clamp, and a slot within said planar portion for passing therethrough the band portion of a band-clamp.

17. The hand tool of claim 14, wherein said cutting notch and said band-clamp head grasping means lie between said blade and said handle.

18. The hand tool of claim 14, wherein said wire or band-clamp cutting blade is approximately perpendicular to said handle member.

19. The hand tool of claim 14, wherein said band-clamp band grasping means further comprises a band engagement and clamping portion and a band support portion.

20. The hand tool of claim 19, wherein said band engagement and clamping portion articulates relative to said band support portion, said band engagement and clamping portion being rotatably biased toward said band support portion.

21. The hand tool of claim 14, wherein said knife portion and said cutter portion are biased apart by resilient means.

22. The hand tool of claim 14, further comprising releasable locking means.

23. The hand tool of claim 22, wherein said releasable locking means comprises a hook-and-pin latch.

24. The hand tool of claim 14, wherein said insulation cutting blade further comprises a piercing tip.

25. A multipurpose hand tool for cutting continuous-wire reinforced flexible insulation duct, and for installing and tensioning a band-clamp therearound, the tool being operable with one hand, comprising:
    a knife portion comprising a blade member, a cutting notch, a wire cutting member, a band-clamp head grasping means, and a handle member;
    a cutter portion comprising a wire or band-clamp cutting member, a band-clamp band grasping means, and a handle member;
    a pin for pivotally joining the knife and cutter portions;
    a spring for biasing the handle member of the cutter portion to the open position; and,
    releasable a hook-and-pin latch for securing the tool in a closed position.

26. The hand tool of claim 25, wherein said band-clamp head grasping means further comprises a substantially planar portion for engaging the head portion of a band-clamp, and a slot within said planar portion for passing therethrough the band portion of a band-clamp.

27. The hand tool of claim 25, wherein said cutting notch and said band-clamp head grasping means lie between said blade and said handle.

28. The hand tool of claim 25, wherein said wire or band-clamp cutting member is approximately perpendicular to said handle member.

29. The hand tool of claim 25, wherein said band-clamp band grasping means further comprises a band engagement and clamping portion and a band support portion.

30. The hand tool of claim 29, wherein said band engagement and clamping portion articulates relative to said band support portion, said band engagement and clamping portion being rotatably biased toward said band support portion.

31. The hand tool of claim 25, wherein said insulation cutting blade further comprises a piercing tip.

* * * * *